United States Patent [19]

France

[11] 3,944,976

[45] Mar. 16, 1976

[54] ELECTRONIC SECURITY APPARATUS

[76] Inventor: Rode France, 880 La Cuesta, Los Altos, Calif. 94022

[22] Filed: Aug. 9, 1974

[21] Appl. No.: 496,005

[52] U.S. Cl. .......................... 340/146.2; 340/149 A

[51] Int. Cl.² .......................................... H04Q 3/00

[58] Field of Search .......... 235/177, 153 R, 61.7 B; 340/146.2, 146.1 AL, 146.1 R; 147 MD, 147 LP, 149 R, 149 A, 172.5

[56] References Cited

UNITED STATES PATENTS

| | | | |
|---|---|---|---|
| 3,119,097 | 1/1964 | Tullos | 340/146.1 A |
| 3,587,051 | 6/1971 | Hovey | 340/149 A |
| 3,609,697 | 9/1971 | Blevins | 340/172.5 |
| 3,624,608 | 11/1971 | Altman et al. | 340/149 A |
| 3,654,604 | 4/1972 | Crafton | 340/149 R |
| 3,688,269 | 8/1972 | Miller | 230/149 A |
| 3,704,890 | 12/1972 | Zucker et al. | 340/149 A |
| 3,732,542 | 5/1973 | Hedin | 340/149 A |
| 3,761,892 | 9/1973 | Bosnyak et al. | 340/149 A |
| 3,786,471 | 1/1974 | Hockman et al. | 340/149 A |
| 3,821,704 | 6/1974 | Sabsay | 340/149 A |
| 3,845,361 | 10/1974 | Watase et al. | 340/149 A |
| 3,846,756 | 11/1974 | Schmitz | 340/149 A |

*Primary Examiner*—Charles E. Atkinson
*Attorney, Agent, or Firm*—A. C. Smith

[57] ABSTRACT

An improved electronic lock includes a random bit-pattern generator which may be selectively cycled through a plurality of bit-pattern combinations to provide a code that can be stored in a mating electronic key. Several bit-patterns or codes may be stored in a single key for convenient use in operating a corresponding number of separate locks.

11 Claims, 8 Drawing Figures

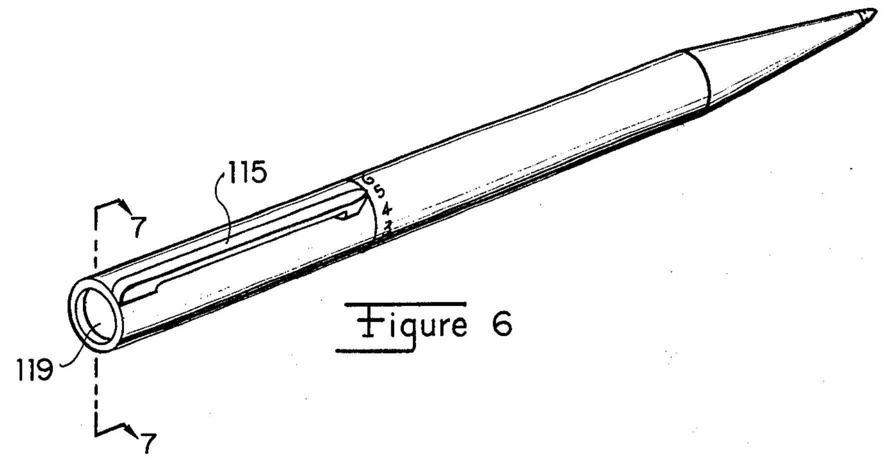
Figure 6
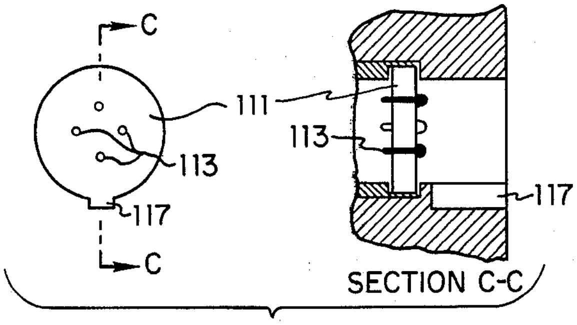
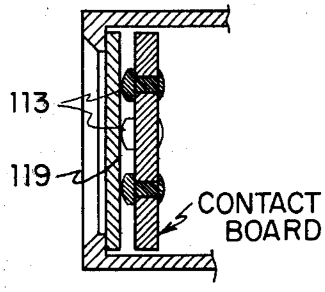
Figure 5
Figure 7
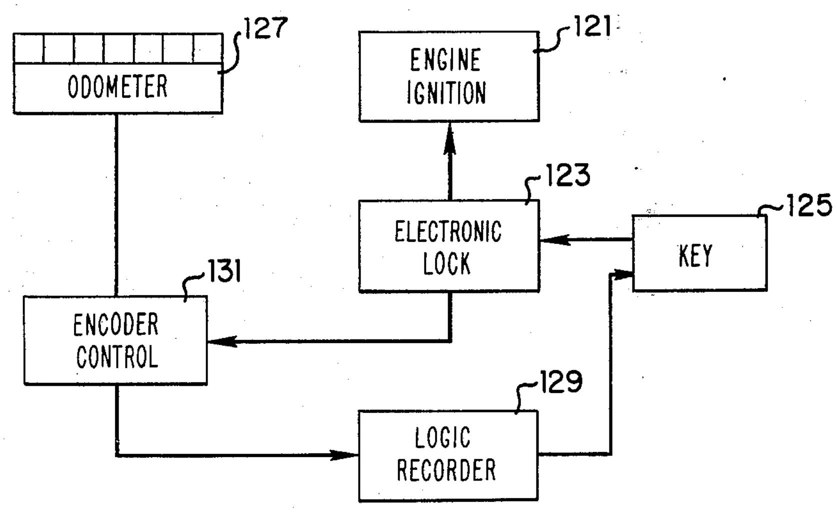
Figure 8

ELECTRONIC SECURITY APPARATUS

BACKGROUND OF THE INVENTION

Certain known electronic locks employ coding techniques such as number scramblers or encoders that manipulate a manually selected key combination to provide, on a magnetic card or punched card or the like, an encoded key combination in scrambled order. In locks of this type, a card-reading mechanism is usually required and the security against detection of the key combination is usually preserved only to the extent of the complexity of the scrambling technique. It would be desirable in electronic locks to obviate the dependence for security upon the complexity of the scrambling or encoding of key combinations and still retain the versatility and multiplicity of possible individual combinations which can be set conveniently in the field.

SUMMARY OF THE INVENTION

Accordingly, the present invention provides an electronic lock and an electronic key, each of which include active shift registers and one of which may be operated to generate a random bit pattern that can be transferred to and stored in the other to serve as the key combination. Since the key combination thus generated is a random bit pattern, detection of the combination is made more difficult than in conventional locks wherein the scrambling or encoding technique need only be deciphered to determine the key combination. Also, the key combination may be changed after each use in accordance with the present invention where it is desirable to further enhance the lock security against detection of the key combination. Further, a probe-like electronic key is provided which makes contact with the lock and which may contain several individual key combinations for convenient key-ring storage in the single electronic key.

DESCRIPTION OF THE DRAWINGS

FIG. 5 is a pictorial diagram of the key slot in the installation of FIG. 4;

FIG. 6 is a pictorial diagram of the electronic key according to the preferred embodiment of the present invention;

FIG. 7 is a sectional view of the contact mechanism of the key of FIG. 6; and FIG. 8 is a block diagram of one embodiment of the present invention which uses the key combination for identification and billing as in automobile rental applications.

DESCRIPTION OF THE PREFERRED EMBODIMENT

Figure 1:
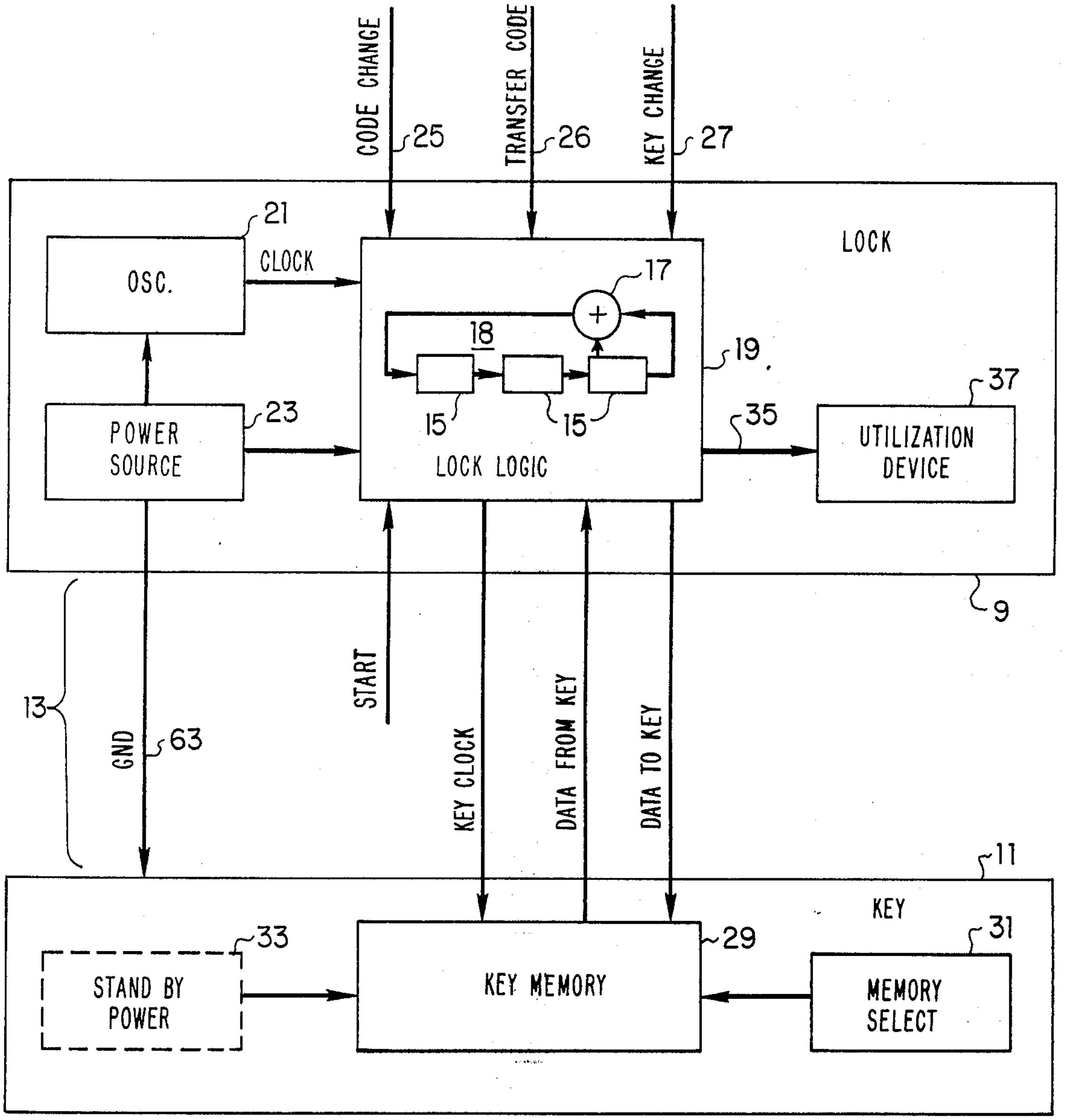
FIG. 1 is a block diagram of the electronic lock and key according to the preferred embodiment of the present invention.

Referring now to FIG. 1, the present lock system includes a lock 9 and a key 11 which are linked for cooperative operation either by conductive or radiative connections 13. The lock 9 includes a plurality N of logic elements 15 and modulo 2 adders 17, or the logical equivalent thereof, interconnected in conventional manner to form a random bit-pattern shift register 18 which is included within the circuitry of the lock logic 19. Shift registers of this type are referred to in the literature (see, for example, U.S. Pat. Nos. 3,439,279 and 3,596,245).

The lock logic 19 of the lock receives an input from oscillator 21 for clocking the operation of the shift register, as later described. A code change input line 25, transfer code input line 26, and a key change input line 27 facilitate the programming of the lock 9 and key 11, as later described.

The key 11 includes a shift register of N bit length in the memory 29. For memory means having more than one key code, as later described, the memory selector 31 is connected to determine which combination in the memories will be presented at the output lines for comparison with a lock combination. Both the lock shift register and the key shift register(s) receive power from sources 23 and 33, respectively. Upon "true" or correct parity between the lock bit-pattern and the key bit-pattern, as detected by the lock logic 19, the resulting output signal on line 35 actuates a utilization device such as a lock mechanism 37.

Figure 2:
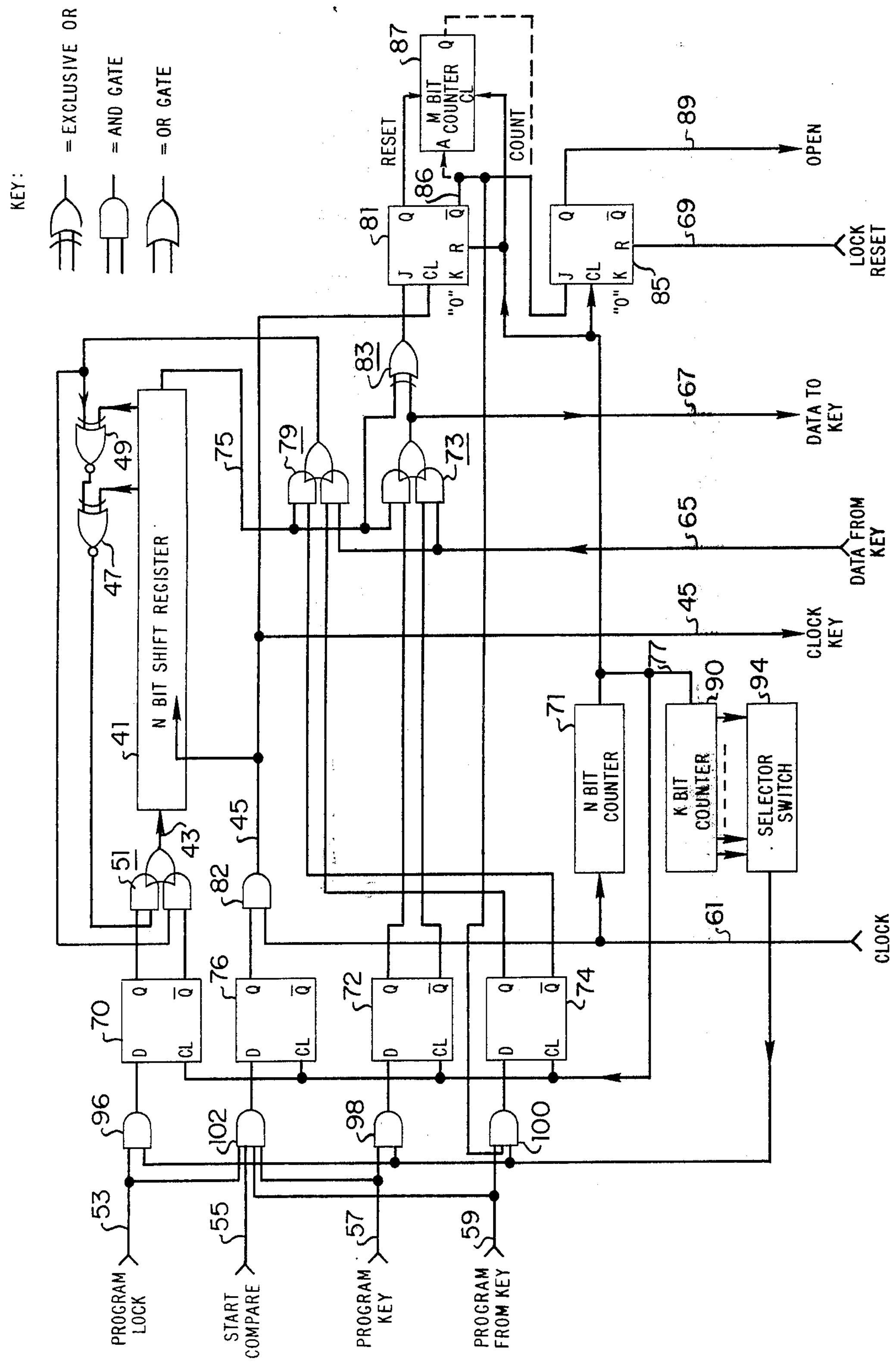
FIG. 2 is a schematic diagram of the electronic lock for the embodiment of FIG. 1.

Referring now to FIG. 2, there is shown a simplified schematic diagram of the electronic lock according to one embodiment of the present invention. The shift register 41 includes a plurality N of bistate logic elements successively connected to be triggered to the logic state of a preceding logic element in response to an input signal 43 applied to the initial one of the logic elements during successive clock signals applied at input 45. A series of gates 79, 47, 49, 51 are connected to combine the outputs from selected ones of the logic elements with the output 75 from the last logic element in succession for applying the combined outputs to the input 43, thereby to form a conventional random bit-pattern shift register.

The shift register 41 is selectively controlled by the inputs on lines 53, 55, 57 and 59. Thus, when it is desired to reset the bit pattern of the shift register, and therefore the lock combination, the line 53 is asserted to program the lock. The D flip-flops 70 and 76 in combination with the clock signal (from oscillator 21 of FIG. 1) on line 61 enables gates 51 and 82 for a period determined by signal on line 77 to successively clock the shift register through a number of shifts which can occur while line 53 is asserted. The shift register 41 thus attains a random bit pattern after flip-flop 70 receives a clock input 77 following the end of the assertion of line 53. The clock resetting of flip-flop 70 deactivates gates 51, leaving the bit pattern stored in register 41. Alternatively, the lock shift register 41 may be manually set to a preselected bit pattern with the aid of an external shift register that has been set to the selected bit pattern. The lock shift register may then be clocked through the sequence of bits in the preselected pattern, in the manner later described in connection with the programming of a key, in order to establish the same preselected (rather than random) bit pattern. As a result, the terms "key" and "lock" as used herein are only relative, and the apparatus described in connection with the lock unit may be contained in the key unit, and vice versa. Also, as used herein, the "lock mechanism" is merely illustrative of an output utilization device which is to be activated upon parity check of lock and key bit patterns, and may include a turn-on device, an alarm, or the like.

When it is desirable to program the key to attain the same bit pattern as is retained in shift register 41, the key is coupled to the line 67 via conductive connection or radiative link, and the line 57 is asserted to program the key. The D flip-flops 72 and 76 in conjunction with the gates 82 and 73 successively clock out onto the line 67 the logic levels of the bit patterns that are successively shifted out of the output 75 and recirculated in the shift register 41 per clock signal appearing on line 61. The counter 71 counts up the same N number of logic events and produces a disabling signal on line 77 to disable the flip-flops 70, 72, 74, 76 at the end of a complete shift register cycle. The shift register of the key, later described, thus attains the same bit pattern of N logic elements as is contained in the one of the K number of sets in shift register 41. The flip-flop 76 is connected to be activated upon assertion of any of lines 53, 55, 57 or 59 in order to enable gate 82 to pass the requisite clock pulses.

Similarly, when it is desired to program the lock shift register 41 with the bit pattern of logic states contained in a key, the line 59 may be asserted to activate the D flip-flop 74. The gates 79 connected thereto are enabled to introduce the logic levels of the bit patterns from the key shift register which appear on the input line 65 into the signal path of gates 79 and 51 to the input 43 of shift register 41. After the number N of logic bits are clocked into the shift register 41, as counted by counter 71, the resulting disabling signal 77 from counter 71 disables the flip-flop 74 after line 59 is no longer asserted, thereby completing the transfer of the bit pattern from the key to the shift register 41.

During the comparison of a bit pattern from a key with the bit pattern from the lock (i.e. from shift register 41), the line 55 is asserted to control the comparison operation. This enabled D flip-flop 76 which then enables gate 82 for applying clock signals to the clock input of J-K flip-flop 81. Logic levels from the key appearing on line 65 are compared per clock signal with the logic levels from shift register 41 via gates 73 and 83 connected to the J input of flip-flop 81. Upon the appearance of N clock signals, the counter 71 produces the disabling signal 77 which is applied to the reset input of flip-flop 81 and to the flip-flop 85 to terminate the comparison cycle. If parity of bit patterns occurred, the output 86 of J-K flip-flop 81 will be high and, as applied to J-K flip-flop 85, will actuate the same to produce the desired output 89 for application to a lock mechanism or other utilization circuit. This output 86 may be applied directly to J-K flip-flop 85, or optionally through an M-bit counter 87, to provide the lock-enabling output signal 89. If applied through counter 87, the number M of occurrences of parity comparison cycles will have been completed before the lock-enabling output signal 89 is produced. This avoids the possibility of actuating the lock by a fortuitous random bit pattern generated only once in a sweeping fashion, for example, during an attempt to activate the lock for unauthorized purposes. The lock reset input line 69 may then be asserted at a convenient time after appearance of the output on line 89, say after the locked portal is again closed, in order to reset flip-flop 85 and thereby terminate the output signal 89.

As an extension of the illustrated embodiment, a clock cycle counter 90 and a selector 94 may be coupled to the output of counter 71 in order to provide multiple different combinations within a single lock, each for comparison with a different key. The shift register 41 in this embodiment includes K number of complete registers of N length each, such that each of the N-length registers may contain a separate bit pattern and may be accessed at output 75 in serial fashion from the first such bit pattern to the Kth. The digits of the clock cycle counter 90 are compared in a selector 94 which may be manually or electronically set to a given one of the K number of different bit patterns contained in register 41. Upon parity of digits being detected in selector 94, the output produced on its output line activates the gate 96, 98, 100 corresponding to the line 53, 57 or 59 which is asserted. This, in turn, activates the associated flip-flop 70, 72, 74 such that the selected Kth one of the N bit registers is accessed to perform the function required by the assertion of a line 53, 57 or 59. When the comparison line 55 is aserted, all of the K number of N bit registers are accessed seriatum and this operation is not affected by selector 94.

Figure 3:
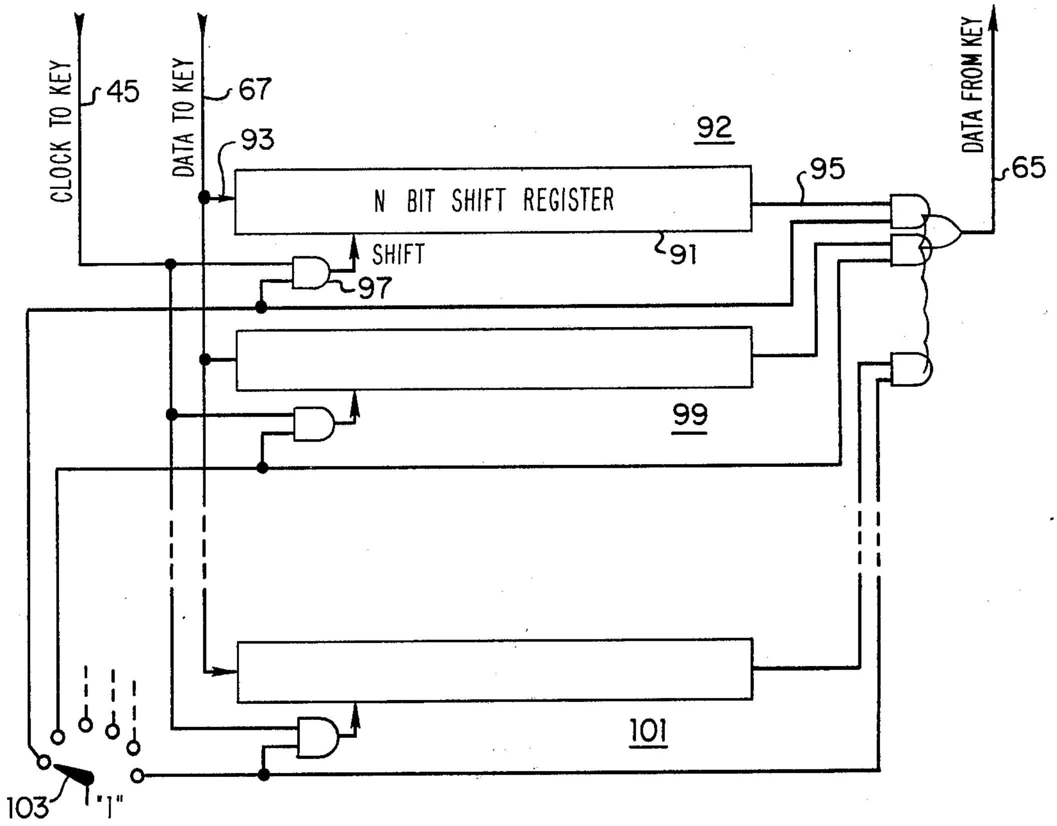
FIG. 3 is a schematic diagram of the electronic key for the embodiment of FIG. 1.

Referring now to FIG. 3, there is shown a schematic diagram of one embodiment of an electronic key according to the present invention for actuating the lock embodiment of FIG. 2. The key includes a shift register 92 comprising the same number N of bistate logic elements successively connected to sequentially shift in synchronism with applied clock pulses on line 45 a given logic state from the stage at the input 93 to the stage at the output 95. When the "program key" line 57 of FIG. 2 is asserted, the output bit pattern from the lock shift register 41 appearing on line 67 is introduced into the shift register 92 and is clocked through successive shifts via the clock pulses on line 45 applied through gate 97 in a conventional manner to establish the same bit pattern in register 92 as is stored in register 41. Each key may contain a plurality of similar shift registers and gates 99, 101, etc., arranged for parallel access, as shown, or arranged for serial access and selection, for example, in a manner similar to that previously described with respect to register 41 in order to provide an entire "key ring" of keys in a single unit. The key combination or bit pattern to be provided by the unit is determined by selector switch 103 that is connected to enable the clock gate 97, etc., of a selected shift register. Upon assertion of the start compare line 55 of FIG. 2, the selected shift register 92, 99, 101, etc., produces the bit pattern stored therein at clocked intervals on the output line 65 for comparison, in the manner as previously described, with the bit pattern being clocked out of the shift register 41 of the lock. Upon parity of bits in synchronous clock intervals, the output line 89 is asserted to activate a lock mechanism, as previously described.

Figure 4:
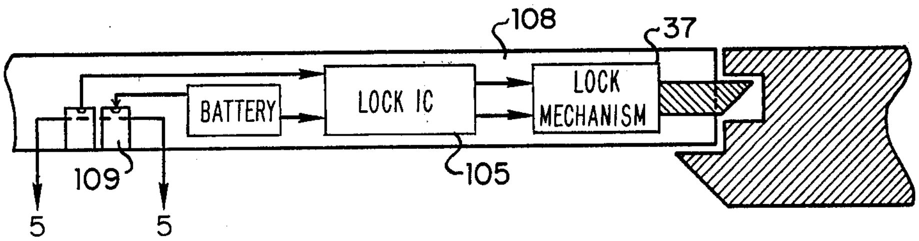
FIG. 4 is a pictorial diagram of an installation of the electronic lock.

Referring now to FIGS. 4 and 5, there is shown a pictorial diagram of a lock mechanism using the lock and key apparatus of the present invention. The electronic circuitry forming the lock 105, for example as shown in FIG. 2, may be formed on an integrated circuit using conventional technology and may be coupled to an electric lock mechanism 37 in a security panel such as a door 108, or the like. The key port 109 may include a recessed contact panel 111 which is accessible at the base of the port. The contacts 113 may be arranged in a selected pattern for conductively connecting such lines as 45, 65, 67, etc., of FIGS. 2 and 3 between lock and key units. As previously described, the connections between lock and key units may also be effectively completed via conventional radio link in order to provide remote key operation. Both the lock and the key units include power sources for maintaining the shift register bit-patterns in memory and for operating the circuitry as required by the shift register technology involved. Where magnetic core or magnetic domain (i.e., "bubble memories") technology is used in the key, a power source may be eliminated from the key.

Referring now to FIGS. 6 and 7, there are shown pictorial and sectional views, respectively, of a key mechanism according to the present invention. The probe-like shape of the key unit includes an indexing element such as a clip 115 to mate with the keyway 117 of the key port 109 and thereby align the contacts at the end thereof with the pattern of contacts 113 in the key port. Also, the indexing element 115 may serve as the indexer for the selector switch 103 to identify which key bit pattern is selected. The contact end 119 of the unit may be covered with a layer of conductive rubber (for example, of the type described by Chomerics, Inc., Woburn, Mass.) which has high sheet resistance and which shows a substantial decrease in resistance down to a few ohms in regions thereof to which concentrated contact pressure is applied. The pattern of raised contacts may thereby be hidden and the key unit may be sealed against adverse conditions of use.

Referring now to FIG. 8, there is shown a block schematic diagram of one application of the present invention which provides encoding information in addition to lock-key service. The engine ignition 121 of an automobile, say available for rent, is controlled by an electronic lock 123 and key 125 according to the present invention. In addition, the odometer 127 of the automobile is of the digital variety which provides an encoded output per digit in a conventional manner to provide an electronic indication of the displayed digits. This electronic odometer information and the bit pattern of the lock are applied to an encoder control unit 131.

In operation, the lock 123 may be newly set to a bit pattern upon rental of the automobile. The key 125 is set to the same combination or bit pattern, in the manner as previously described. Alternatively, the key pattern may be initially set and identified with the person who is newly renting the automobile and the lock pattern is then programmed to the same key pattern, as previously described. In addition, the initial odometer reading may be combined with the new key-lock pattern to identify (a) the individual who is renting the automobile with (b) the key-lock combination and with (c) the initial reading on the odometer.

Upon the conclusion of the rental, the electronic odometer output may be combined in the encoder control 131 with the key-lock combination which identifies the renter to produce an output which is applied to the logic recorder 129 to facilitate the direct printing out of the billing for the rental.

In other applications, for example, in coin-operated public lockers, insertion of a coin may activate the programming of the lock and the key to a new, randomly established bit pattern. Thereafter, the key may be used to actuate the lock mechanism, as previously described, and may again be re-programmed with the lock upon each subsequent use. The present invention is particularly well suited for applications of this type because of the convenient ability to re-program the lock and key to a new combination out in the field merely upon assertion of a single line.

What is claimed is:

1. Electronic security apparatus comprising:

a first set of a plural number N of logic elements capable of attaining distinct logic states interconnected to provide a plurality of logic states or bits;

first gate means having an input connected to the output of the Nth logic element of the first set and having an output connected to the first of the N number of logic elements of the first set for operation therewith as a shift register which produces a selectably changeable pattern of logic states in the first set;

a second set of a plural number of at least N logic elements capable of attaining distinct logic states and interconnected to provide a plurality of logic states or bits;

second gate means having an input connected to the output of the Nth logic element of the second set and having an output connected to the first of the N number of logic elements of the second set for operation therewith as a shift register which produces a selectably changeable pattern of logic states in the second set;

third gate means having an input port connected to the output of the Nth logic element of the first set and having another input port for receiving manifestations of logic states attained by the second set of logic elements for serial comparison with the logic states attained by said first set of logic elements to provide an output signal indicative of parity of compared logic states;

transfer means selectively enabled to couple the logic elements of the first set to the logic elements of the second set for selectively transferring the pattern of logic states from one set to the other set of logic elements;

means for selectively coupling an output of said second set of logic elements to said other input port of the third gate means for selectively comparing therein the logic states serially received from said first and second sets of logic elements; and utilization means connected to said third gate means for responding to said output signal upon occurrence of parity of compared logic states.

2. Electronic security apparatus as in claim 1 comprising:

source means of clock signals;

means coupling the source means to the first and second sets of logic elements for sequentially providing the logic states or bits therefrom for comparison;

counter means for counting a number proportional to N of applied clock signals to produce an output in response thereto; and means coupled to said third gate means for applying thereto the output from said counter means to limit the number of comparisons of logic states to said number proportional to N.

3. Electronic security apparatus as in claim 1 wherein said third gate means includes cycle registering means connected to produce said output signal from said third gate means only in response to a plural number M of complete parity comparisons of N number of logic states.

4. Electronic security apparatus as in claim 1 wherein said means for selectively coupling an output of said